(12) United States Patent
Ehre et al.

(10) Patent No.: US 11,543,314 B2
(45) Date of Patent: Jan. 3, 2023

(54) MEASUREMENT OF OPERATING PARAMETERS ON ACTUATORS

(71) Applicant: Stabilus GmbH, Koblenz (DE)

(72) Inventors: Thomas Ehre, Saarlouis (DE); Raphael Piroth, Koblenz (DE); Ulrich Probst, Hillscheid (DE); Lars Löhken, Linz am Rhein (DE); Markus Müller, Koblenz (DE)

(73) Assignee: Stabilus GmbH, Koblenz (DE)

( * ) Notice: Subject to any disclaimer, the term of this patent is extended or adjusted under 35 U.S.C. 154(b) by 657 days.

(21) Appl. No.: 16/547,632

(22) Filed: Aug. 22, 2019

(65) Prior Publication Data

US 2020/0064223 A1 Feb. 27, 2020

(30) Foreign Application Priority Data

Aug. 23, 2018 (DE) .................. 10 2018 214 295.5

(51) Int. Cl.
  *G01L 5/00* (2006.01)
  *G01M 13/00* (2019.01)
  (Continued)

(52) U.S. Cl.
  CPC ............ *G01L 5/0033* (2013.01); *G01D 5/145* (2013.01); *G01D 5/241* (2013.01); *G01K 13/00* (2013.01);
  (Continued)

(58) Field of Classification Search
  CPC ....... G01M 13/00; G01D 5/145; G01D 5/241; G01K 13/00; G01L 5/0061; G01L 19/00; G01P 15/00; F15B 20/00; G05B 15/02
  (Continued)

(56) References Cited

U.S. PATENT DOCUMENTS

2009/0007626 A1* 1/2009 Boehen ............... F15B 15/2869
  73/1.72
2009/0178554 A1* 7/2009 Boehen ............... F15B 15/2807
  335/205
(Continued)

FOREIGN PATENT DOCUMENTS

CN  102132135 A  7/2011
CN  102216750 A  10/2011
(Continued)

OTHER PUBLICATIONS

Chinese Application No. 201910783091.3, Chinese Office Action dated Apr. 27, 2021, No English translation available, 10 pages.
(Continued)

*Primary Examiner* — Octavia Davis Hollington
(74) *Attorney, Agent, or Firm* — Kilpatrick Townsend & Stockton LLP

(57) ABSTRACT

The invention relates to a method for monitoring operating parameters of an actuator (10), wherein the method comprises: providing the actuator (10), providing at least two detection units (26, 28, 30, 32, 34, 36) which are designed to detect different operating parameters of the actuator (10), detecting operating parameters of the actuator (10) via the detection units (26, 28, 30, 32, 34, 36), outputting data relating to the measured operating parameters to an evaluation unit, combining the measured operating parameters into a state information, which indicates whether or not the technical state of the actuator (10) is in a predetermined standard state.

20 Claims, 1 Drawing Sheet

(51) Int. Cl.
  *G01D 5/14* (2006.01)
  *G01D 5/241* (2006.01)
  *G01P 15/00* (2006.01)
  *G01L 19/00* (2006.01)
  *G01K 13/00* (2021.01)

(52) U.S. Cl.
  CPC ............ *G01L 5/0061* (2013.01); *G01L 19/00* (2013.01); *G01M 13/00* (2013.01); *G01P 15/00* (2013.01)

(58) Field of Classification Search
  USPC ........................................................ 73/865.9
  See application file for complete search history.

(56) References Cited

U.S. PATENT DOCUMENTS

| | | | | |
|---|---|---|---|---|
| 2011/0005387 | A1* | 1/2011 | Ehre | .................. F15B 15/2876 92/5 R |
| 2013/0276516 | A1* | 10/2013 | Tabor | ..................... G01M 3/26 73/37 |
| 2017/0001615 | A1* | 1/2017 | Adler | ...................... B60T 7/042 |
| 2017/0159677 | A1 | 6/2017 | Besch et al. | |

FOREIGN PATENT DOCUMENTS

| | | | | |
|---|---|---|---|---|
| CN | 102943790 | A | | 2/2013 |
| CN | 103994127 | A | | 8/2014 |
| CN | 103498837 | B | * | 3/2016 |
| CN | 105952715 | A | | 9/2016 |
| CN | 106122170 | A | | 11/2016 |
| CN | 107269627 | A | | 10/2017 |
| CN | 206647356 | U | | 11/2017 |
| CN | 107605823 | A | | 1/2018 |
| CN | 107605862 | A | | 1/2018 |
| CN | 107676340 | A | | 2/2018 |
| CN | 107725535 | A | | 2/2018 |
| CN | 107939776 | A | | 4/2018 |
| DE | 69427487 | T2 | | 4/2002 |
| DE | 60208046 | T2 | | 8/2006 |
| DE | 102005051999 | C5 | | 11/2016 |
| EP | 2541074 | A1 | | 1/2013 |
| JP | 2017223335 | A | | 12/2017 |
| KR | 20170035224 | A | * | 3/2017 |
| WO | WO-9319317 | A1 | * | 9/1993 ......... F16K 37/0083 |

OTHER PUBLICATIONS

German Application No. DE10 2018 214 295.5, German Search Report dated Aug. 6, 2019, 8 pages.
Chinese Application No. 201910783091.3, Chinese Office Action dated Apr. 27, 2021, 19 pages.

* cited by examiner

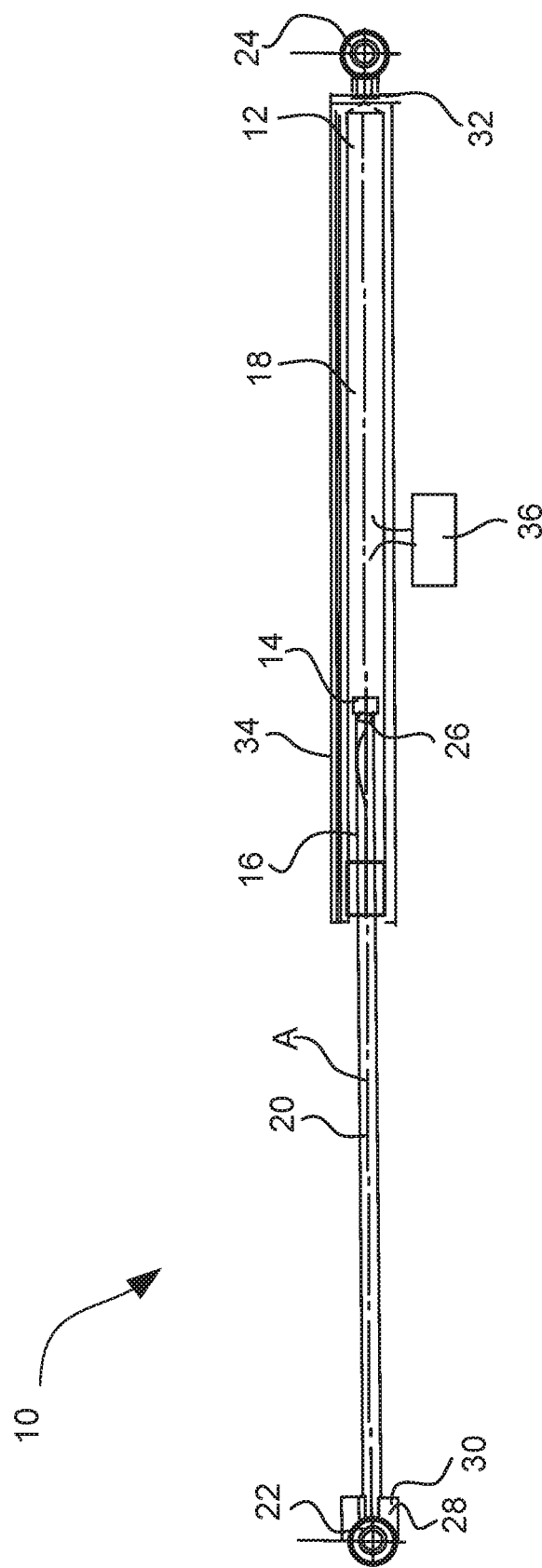

MEASUREMENT OF OPERATING PARAMETERS ON ACTUATORS

CROSS REFERENCE TO RELATED APPLICATION

This application claims priority to German Patent Application No. 10 2018 214 295.5, filed in Germany on Aug. 23, 2018, the entire contents of which are hereby incorporated herein by this reference.

The present invention relates to a method for monitoring operating parameters of an actuator which is designed to displace a first connection means arranged at one end of the actuator for connection to an assembly that is not a part of the actuator relative to a second connection means arranged at the other end of the actuator for connection to another assembly that is not a part of the actuator.

In the past, actuators were already equipped with sensors that monitor a specific operating parameter. However, prior art actuators do not use systems which combine data to make an assessment of the actuators technical condition and/or wear. A preventive maintenance of the actuator or of a system in which the actuator is arranged is thus far only possible based on known average service life of such actuators and not based on the actual state of the actuator used.

It is the object of the present invention to provide a method which makes it possible to monitor the overall state of an actuator based on the actually occurring operating parameters.

This object is achieved according to the invention by a method for monitoring operating parameters of an aforementioned actuator, wherein the method comprises: Providing the actuator, providing at least two detection units which are designed to detect different operating parameters of the actuator, detecting operating parameters of the actuator via the detection units, outputting data relating to the measured operating parameters to an evaluation unit, combining the measured operating parameters into a state information, which indicates whether or not the technical state of the actuator is in a predetermined standard state.

Using the method according to the invention, it is possible to identify from individually detected operating parameters a combined overall state of the actuator. On the basis of the identified overall state of the actuator, it can now be decided whether a corresponding actuator is to be replaced or repaired. Thus, for example, preventive maintenance measures are possible, whereby the failure of a product in which the actuator is arranged, or consequential damages to this product due to the malfunction of the actuator can be prevented. Furthermore, the replacement or repair of the actuator can be better planned, whereby further corresponding costs can be reduced. In addition, based on the method according to the invention, a much more accurate prediction can be made with regard to the remaining service life of the actuator.

Based on the measured overall state, it is also possible to decide whether the actuator should be replaced or repaired.

A statistical evaluation of the data also makes it possible to optimize the actuators produced and/or the production system of the actuators. This can reduce production waste.

It should be noted at this point that the term "detection unit" in the context of the present invention can be understood to include a sensor in the physical sense but is not limited thereto. Rather, a detection option of a specific operating parameter is referred to here as a "detection unit." Thus, the operating parameters detected by a single physical sensor, for example an acceleration sensor, can be "converted" into a further operating parameter, as in this case by integration of the acceleration in displacement and/or speed. The detection of the operating parameter "acceleration" would accordingly represent a first detection unit, the detection of the displacement a second detection unit and the detection of the speed a third detection unit.

In the following, exemplary conceivable combinations are specified which comprise a physical sensor and at least one further detection unit based thereon:

A displacement sensor may be designed to detect a displacement. Based on the detected displacement, it is possible to provide a detection unit that is designed to differentially determine a speed and an acceleration from the displacement.

An acceleration sensor may be designed to detect an acceleration. Based on the detected acceleration, it is possible to provide a detection unit which is designed to determine a speed and/or a displacement by integration of the acceleration.

A force sensor may be designed to detect a push-out force of, for example, a gas spring. Based on the detected force, it is possible to provide a detection unit which is designed to determine a pressure, for example, inside the gas spring.

A pressure sensor may be designed to detect a pressure, e.g. inside the gas spring. On the basis of the detected pressure, it is possible to provide a detection unit which is designed to determine a push-out force of a piston or a piston rod from a cylinder.

In one embodiment of the present invention, the actuator may be a spindle drive comprising a spindle and a spindle nut threadedly engaged with the spindle, and the at least two detection units may comprise at least one displacement sensor, in particular a Hall sensor, and a temperature sensor. For example, a temperature compensation of the acceleration sensor can take place. The measurement can be done inside the gas spring or the damper and/or on the outer pressure tube. In addition, in this way the environmental conditions of the damper may also be determined.

In an alternative embodiment of the present invention, the actuator may be a piston-cylinder arrangement which comprises a cylinder and a piston arranged in the cylinder on which a piston rod is arranged, and the at least two detection units may comprise at least one displacement sensor, in particular one sensor for capacitance measurement and one temperature sensor. The piston-cylinder arrangement may be operated pneumatically or hydraulically. Depending on the arrangement, the piston-cylinder arrangement may be operated passively, for example as a damper or as a gas spring, "passively" being understood here as meaning "absorbing an external force", or being used actively, "actively" here being understood in the sense of "applying a force."

Advantageously, the at least two detection units may comprise at least one acceleration sensor and/or at least one pressure sensor and/or at least one force sensor and/or at least one temperature sensor and/or at least one displacement sensor. By way of example, an acceleration sensor may be used to determine the time required by an actuator in order to accelerate an actuator from a rest position to a predetermined speed for displacing the actuator. Based on the measured acceleration, for example, it can be concluded whether, for example, a leak at a pressure chamber of a piston-cylinder assembly or a contamination of a spindle drive or a reduced power of a drive motor is present.

In one development of the present invention, the evaluation unit can compare the measured operating parameters to predetermined setpoint values. For this purpose, the evaluation unit may comprise a memory unit in which corresponding standard values or a corresponding standard state of the actuator are or is stored. In particular, the standard values or the standard state can be specified as the respective region, so that it can be determined by the evaluation unit whether a measured operating parameter or the combined state information is within a defined standard range.

Here, the predetermined setpoint values may be measured operating parameters which are stored in the evaluation unit during operation of the actuator. The storage unit of the evaluation unit can thus contain no values prior to the operation of the actuator. In order to define a range of predetermined setpoint values, for example, a number of first measured operating parameters, e.g. the first ten values after the actuator is started, may be used. Of course, these can also be combined with values and/or ranges provided by the manufacturer of the actuator. In this way, deviations of the operating parameters over the time of operation of the actuator can be detected.

Of course, this does not mean that no further recordings will take place after the collection of this number of values. In particular, at least one operating parameter can be stored in the memory unit of the evaluation unit at each load change on the actuator. However, these subsequent values may be used as the actual state compared to the predetermined target state.

In particular, the evaluation unit may be designed to output an indication if the measured operating parameters deviate from the predetermined setpoint values. Such an indication can be output, for example, visually and/or acoustically to a user or operator of the actuator.

Advantageously, the evaluation unit may be designed to receive measured operating parameters from a plurality of actuators. In this case, the evaluation unit can act as a central evaluation unit, at which the states of the monitored actuators are displayed either continuously or only in the event of a fault. In this way, the cost of monitoring the actuators of an entire system can be significantly reduced.

In this case, the measured operating parameters can be transmitted to the evaluation unit using a wireless connection. In particular, connections using the Bluetooth protocol, connections via a WLAN, connections via a mobile radio network or general radio connections may be suitable as such wireless connections.

The measured operating parameters may comprise at least one of a temperature at a predetermined location of the actuator, such as at a drive unit or in the pressure chamber of a piston-cylinder arrangement or in a fluid of a piston-cylinder arrangement, a pressure in a pressure chamber of the actuator, an end position value of the actuator which indicates the position in which the actuator is arranged in its respective maximum positions, a capacitance of the actuator, and an acceleration of the actuator for the operation of an actuating element. By combining at least two of these operating parameters, the state information regarding the overall state of the actuator can be defined.

For evaluating the operating parameters, for example, an operating parameter which indicates a displacement or a displacement/time relationship can be offset, i.e. standardized, with an operating parameter which indicates a measured temperature.

Of course, in addition to or as an alternative to the acquisition, operating parameters may also be recorded as values and also as diagrams and/or curves.

It is also conceivable to provide no setpoint value for certain operating parameters. Thus, for example, the monitoring of the end positions of the actuator can then indicate an existing malfunction when the actuator displaces an actuator beyond an end position or not up to the predetermined end position, without the need for a corresponding setpoint value.

In the following, the present invention will be described in more detail based on exemplary embodiments with reference to the accompanying drawings, in which FIG. 1 shows a schematic side cross-sectional view of an embodiment of the invention.

In FIG. 1, an actuator according to the invention is generally designated as 10. The actuator 10 is designed in the exemplary embodiment shown in FIG. 1 as a hydraulic piston cylinder assembly 10.

The actuator 10 includes a cylinder 12 in which a piston 14 is arranged to be displaceable along an axis A. The piston 14 divides the interior of the cylinder 12 into a first working space 16 and a second working space 18. A piston rod 20 is connected to the piston 14 and extends through the first working space 16 and together with the piston 14 is displaceable along the axis A.

At the end of the piston rod 20 opposite the piston 14, a first connection unit 22 is arranged which is adapted to be connected to a superordinate assembly, such as a solar panel. At the end of the actuator 10 opposite the first connection unit 22, a second connection unit 24 is arranged which is adapted to be connected to another superordinate assembly, such as a frame of the solar panel.

In the following, sensors and their positioning on the actuator 10 will be described by way of example for this embodiment, wherein it should be mentioned here that the described sensors may also be arranged individually or in any combination with each other, even though here they are described together.

On the piston 14 or in the piston rod 20, at an end of the piston rod 20 adjacent to the piston 14, a temperature sensor 26 is arranged which is designed to detect a temperature in the vicinity of the piston 14. In order to output the temperature value detected by the temperature sensor 26 to an evaluation unit (not shown), for example, a cable connected to the temperature sensor 26 can be routed through the piston rod 20 and out of the first connection unit 22.

Adjacent to the first connection unit 22, for example in one end of the piston rod 20 adjacent to the first connection unit 22, an acceleration sensor 28 is arranged in combination with another temperature sensor 30. The acceleration sensor 28 is designed to detect an acceleration, with which the piston rod 20 and, thus the first connection unit 22, is displaced. If the cylinder 12 is not accelerated, the acceleration sensor 28 may detect a relative acceleration of the piston rod 20 and the first connection unit 22 relative to the cylinder 12, respectively. The further temperature sensor 30 is designed to detect a temperature in the vicinity of the acceleration sensor 28. The temperature detected by the further temperature sensor 30 can be used, for example, to be combined together with the data of the acceleration sensor 28 in an evaluation unit (not shown), such that the data of the acceleration sensor 28 are "standardized" with the data of the further temperature sensor 30, which means that environmental conditions that may affect the data detected by the acceleration sensor 28 can be compensated by the provision of further sensors, such as by the provision of the further temperature sensor 30.

The acceleration detected by the acceleration sensor 28 can be compared, for example, in the evaluation unit with a predetermined acceleration. A deviation of these two values from one another can show that the actuator 10 cannot be operated within the predetermined standard values, for example because a predetermined pressure to be built up in the second working space 18 cannot be achieved, so that the piston 14 and thus the piston rod 20 and the first connection unit 22 cannot be displaced with the predetermined acceleration.

At an end of the cylinder 12 adjacent to the second connecting unit 24, a force sensor 32 is arranged in the embodiment of the actuator 10 shown in FIG. 1. The force sensor 32 is designed to detect a force which acts between the cylinder 12 and the second connection unit 24. For example, if the actuator 10 is not actuated, that is, the piston 14 and the piston rod 20 remain undisplaced relative to the cylinder 12, or in other words, the first connection unit 22 remains at a constant distance from the second connection unit 24, then the force sensor 32 may be designed in such a way as to determine a tensile or compressive force which acts between the first connection unit 22 and the second connection unit 24.

Falling below a predetermined force between the connecting units 22 and 24 may indicate that the actuator 10 is displaced without active drive, that is, passively displaced, which in turn may indicate a leak from, for example, the second working space 18.

On the cylinder 12, in particular on its outer side, a displacement sensor 34 is arranged. The displacement sensor 34 is designed to detect a displacement of the piston 14 relative to the cylinder 12. The displacement sensor 34 may also be designed by a corresponding calibration to output a signal which indicates the length/distance by which the piston 14 has been displaced within the cylinder 12. The displacement sensor 34 may also be designed by corresponding conversion of the displacement signal to detect a speed and/or an acceleration of the piston 14.

If, for example, a displacement of the piston 14 in the cylinder 12 is detected by the displacement sensor 34 without the actuator 10 being actuated, it can be determined by the above-described evaluation unit that the actuator has a leak and/or the amount of fluid has fallen below a predetermined amount in one of the working spaces 16, 18.

A pressure sensor 36 is arranged here outside the cylinder 12 in fluid communication with the second working space 18. The pressure sensor 36 is designed to detect a pressure prevailing in the second working space 18. In this case, any fluid present in the second working space 18 may be a gas, such as air, or an oil. Alternatively or additionally, a pressure sensor (not shown) may be connected to the first working space 16.

If a pressure prevailing in the second working space 18 is detected by the pressure sensor 36 over a predetermined period of time, a determination regarding a leak in the second working space 18 due to, for example, a worn seal of the piston 14, can be made via a change in the pressure prevailing in the second working space 18 using, for example, the above-mentioned evaluation unit.

Although not shown in FIG. 1, at least one of the two longitudinal ends of the cylinder 12 may be provided with an end position sensor which is designed to detect whether the piston 14 in its maximum positions relative to the cylinder 12, that is to say a fully retracted piston rod 20 and a fully extended piston rod 20, is located at a predetermined position or deviates therefrom. If the end position sensor detects that the end position of the piston 14 deviates from the predetermined position, it can be determined by the evaluation unit that the actuator 10 cannot be operated within its standard values, for example because an end stop for the piston 14 is worn.

According to a method according to the invention, which can be based on the above-described actuator 10, at least two different operating parameters, which have been detected, for example, by the sensors described above, are forwarded to the evaluation unit. In the evaluation unit, these two operating parameters are combined to form an overall state of the actuator 10. The overall state of the actuator 10 provides a coherent determination about the extent to which the actuator 10 can still perform its predetermined purpose. It may be possible that a first operating parameter is outside of a predetermined standard range for this, but the overall state, which includes, inter alia, these operating parameters that are not within the standard range, indicates that the actuator 10 is functioning properly within predetermined tolerances.

Taking into account the individual operating parameters and the overall state of the actuator 10, it is possible to make a reliable statement about a future functionality of the actuator 10, that is to say a prognosis of its service life.

The invention claimed is:

1. A method for monitoring operating parameters of an actuator which is designed to displace a first connection means arranged at one end of the actuator for connection to an assembly that is not a part of the actuator relative to a second connection means arranged at the other end of the actuator for connection to another assembly that is not a part of the actuator, wherein the method comprises:
    providing the actuator,
    providing at least two detection units which are designed to detect operating parameters of the actuator, wherein the at least two detection units comprise an acceleration sensor,
    detecting the operating parameters of the actuator via the at least two detection units by at least using the acceleration sensor to determine a time required by the actuator to accelerate the actuator from a rest position to a predetermined speed for displacing the actuator,
    outputting data relating to the detected operating parameters to an evaluation unit,
    combining the detected operating parameters to a state information, which indicates whether or not a technical state of the actuator is in a predetermined standard state.

2. The method according to claim 1, wherein the actuator is a spindle drive which comprises a spindle and a spindle nut threadedly engaged with the spindle, and wherein the at least two detection units further comprise at least one displacement sensor, in particular a Hall sensor, and a temperature sensor.

3. The method according to claim 1, wherein the actuator is a piston-cylinder arrangement which comprises a cylinder and a piston arranged within the cylinder on which a piston rod is arranged, and wherein the at least two detection units further comprise at least one displacement sensor, in particular a sensor for capacitance measurement, and a temperature sensor.

4. The method according to claim 1, wherein the at least two detection units further comprise at least one pressure sensor and/or at least one force sensor and/or at least one temperature sensor and/or at least one displacement sensor.

5. The method according to claim 1, wherein the evaluation unit compares the detected operating parameters with predetermined setpoint values.

6. The method according to claim 5, wherein the predetermined setpoint values are measured operating parameters which are stored in the evaluation unit during operation of the actuator.

7. The method according to claim 6, wherein the evaluation unit is designed to output an indication if the detected operating parameters deviate from the predetermined setpoint values.

8. The method according to claim 1, wherein the evaluation unit is designed to receive measured operating parameters from a plurality of actuators.

9. The method according to claim 1, wherein the detected operating parameters are transmitted to the evaluation unit using a wireless connection.

10. The method according to claim 1, wherein the detected operating parameters comprise an acceleration of the actuator for the operation of an actuating element and, optionally, at least one of a temperature at a predetermined location of the actuator, a pressure in a pressure chamber of the actuator, an end position value of the actuator which indicates a position in which the actuator is arranged in its respective maximum positions, a capacitance of the actuator.

11. A system, comprising:
an actuator;
at least two detection units configured to detect operating parameters of the actuator, wherein the at least two detection units comprise an acceleration sensor; and
an evaluation unit configured to receive data relating to detected operating parameters of the actuator and to combine the detected operating parameters to a state information, the state information indicates whether or not a technical state of the actuator is in a predetermined standard state, wherein the detected operating parameters are detected by at least using the acceleration sensor to determine a time required by the actuator to accelerate the actuator from a rest position to a predetermined speed for displacing the actuator.

12. The system of claim 11, wherein the actuator is a spindle drive which comprises a spindle and a spindle nut threadedly engaged with the spindle, and wherein the at least two detection units further comprise a Hall sensor and a temperature sensor.

13. The system of claim 11, wherein the actuator is a piston-cylinder arrangement which comprises a cylinder and a piston arranged within the cylinder on which a piston rod is arranged, and wherein the at least two detection units further comprise a sensor for capacitance measurement and a temperature sensor.

14. The system of claim 11, wherein the at least two detection units further comprise one or more of at least one pressure sensor, at least one force sensor, at least one temperature sensor, or at least one displacement sensor.

15. The system of claim 11, wherein the evaluation unit compares the detected operating parameters with predetermined setpoint values.

16. The system of claim 15, wherein the predetermined setpoint values are measured operating parameters which are stored in the evaluation unit during operation of the actuator.

17. The system of claim 16, wherein the evaluation unit is configured to output an indication if the detected operating parameters deviate from the predetermined setpoint values.

18. The system of claim 11, wherein the evaluation unit is configured to receive measured operating parameters from a plurality of actuators.

19. The system of claim 11, wherein the detected operating parameters are transmitted to the evaluation unit using a wireless connection.

20. The system of claim 11, wherein the detected operating parameters comprise an acceleration of the actuator for the operation of an actuating element and, optionally, at least one of a temperature at a predetermined location of the actuator, a pressure in a pressure chamber of the actuator, an end position value of the actuator which indicates a position in which the actuator is arranged in its respective maximum positions, a capacitance of the actuator.

* * * * *